United States Patent [19]

Kuster et al.

[11] Patent Number: 5,330,550
[45] Date of Patent: Jul. 19, 1994

[54] INSTALLATION FOR THE BENDING OF GLAZING

[75] Inventors: Hans-Werner Kuster, Aachen; Werner Diederen, Herzogenrath; Karl-Josef Ollfisch, Aachen, all of Fed. Rep. of Germany

[73] Assignee: Saint-Gobain Vitrage International, Courbevoie, France

[21] Appl. No.: 15,843

[22] Filed: Feb. 10, 1993

[30] Foreign Application Priority Data

Feb. 10, 1992 [DE] Fed. Rep. of Germany ....... 4203751

[51] Int. Cl.$^5$ ............................................. C03B 23/03
[52] U.S. Cl. ........................................ 65/260; 65/289
[58] Field of Search ................ 65/106, 107, 260, 285, 65/289, 290, 287, 361

[56] References Cited

U.S. PATENT DOCUMENTS

| 4,072,493 | 2/1978 | Imler | 65/107 |
|---|---|---|---|
| 4,575,390 | 3/1986 | McMaster | 65/106 |
| 4,578,103 | 3/1986 | Fackelman | 65/106 |
| 4,711,653 | 12/1987 | Frank | 65/106 |
| 4,741,751 | 5/1988 | Claassen et al. | |
| 5,004,491 | 4/1991 | McMaster et al. | |

FOREIGN PATENT DOCUMENTS 0183418 6/1986 European Pat. Off.
0229337 7/1987 European Pat. Off.

*Primary Examiner*—Peter Chin
*Assistant Examiner*—John Hoffmann
*Attorney, Agent, or Firm*—Oblon, Spivak, McClelland, Maier & Neustadt

[57] ABSTRACT

An installation for the bending of glazings (6) includes a continuous furnace (1), a station for bending by pressing (10) with a lower shape (11) and a suction shape (15), a plate-suction device (50) that can be displaced longitudinally to transport the glazings (6) from the roller conveyor (7) to the station for bending by pressing (10), and an annular frame (35) that can be displaced horizontally to transport the bent glazings (61) to the cooling station (4). Lower shape (11) is mounted stationary lengthwise and a transfer station (30) is provided between the station for bending by pressing (10) and the cooling station (4). The upper shape can be displaced between the station for bending by pressing (10) and the transfer station (30), in synchronism with the plate-suction device (50).

9 Claims, 4 Drawing Sheets

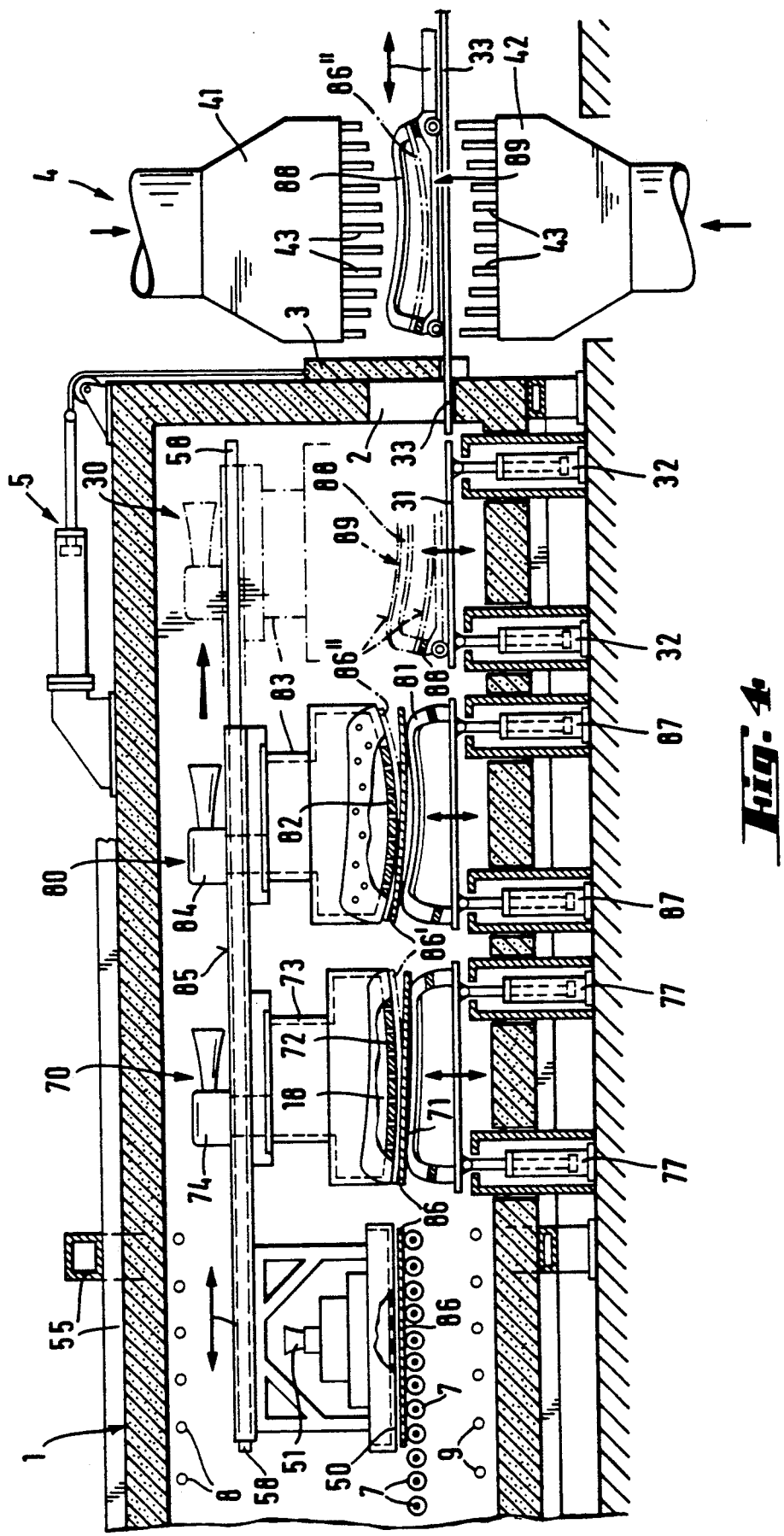

INSTALLATION FOR THE BENDING OF GLAZING

BACKGROUND OF THE INVENTION

1. Field of the Invention

This invention relates to an installation for the bending of glazings, comprising a continuous furnace intended to heat the glazings to the bending temperature, a station for bending by pressing with a lower shape and an upper suction shape, a plate suction means that can be displaced longitudinally to transport the glazings from the conveyor of the continuous furnace to the station for bending by pressing, and an annular support frame that can be displaced horizontally to transport the bent glazings from the station for bending by pressing to a cooling station.

2. Description of the Related Art

Installations with such a structure are, for example, described in EP-0 229 337 B1 and US-PS-4 741 751. In these known installations, during the introduction of the glazing into the bending press, the plate-suction means is displaced to a position between the pressing shapes of the stationary-mounted bending press. A relatively long production cycle results because the following glazing can be introduced into the bending station only when the support frame carrying the already bent glazing has left the bending station.

Installations of the above type and exhibiting a shortened production cycle are known from EP-0 183 418 and US-PS-5 004 491. In these known installations, the lower bending form of the press is able to move and, between the station for bending by pressing and the roller conveyor, an additional transfer station is provided in which the glazing to be bent is transferred from the plate suction means to the lower bending shape. While this transport is being performed, the preceding glazing, already bent, is simultaneously deposited on a frame from the stationary upper suction shape. When the annular frame for transport is displaced to the cooling station, the lower bending shape on which the following glazing is laid is displaced simultaneously to the station for bending by pressing.

In the case of the installation known from EP-0 183 418, the lower shape is designed as a concave bending mold, whereas, in the case of US-PS-5 004 491, it is designed as a convex bending mold. In both cases, the glazing is deposited flat by the plate-suction means onto the lower shape, which it touches necessarily only at the highest points of the molding surface. Because of this relatively unstable position before the bending operation, no significant braking or accelerating force can be exerted on the bending mold during the transport of the glazing to the bending station using the lower shape, so that this transport operation can be performed only at a low speed. For this reason, the gain in production cycle time is relatively slight in relation to the known installations cited above.

SUMMARY OF THE INVENTION

The invention has as an object to provide an installation of the type specified above and having a shortened production cycle, without harming the quality of the bent glazings, so that the profitability of the installation is, on the whole, proportionately increased.

This object is attained according to the invention by an installation for the bending of glazing, comprising a continuous furnace intended to heat the glazings to the bending temperature, a station for bending by pressing with a lower bending shape and an upper suction shape, a plate-suction means that can be displaced longitudinally to transport the glazings from the conveyor of the continuous furnace to the station for bending by pressing, and an annular frame that can be displaced horizontally to transport the bent glazings from the station for bending by pressing to a cooling station. According to the invention, this installation is such that the lower bending shape is mounted stationary downstream from the conveyor of the continuous furnace, a transfer station is provided to transfer the bent glazings from the upper suction bending mold onto the annular support frame between the station for bending by pressing and the cooling station and the upper suction bending mold can be displaced between the station for bending by pressing and the transfer station, in synchronism with the plate-suction means.

In the case of the installation according to the invention, on the one hand, the two transport operations, namely the transfer and the transport of the plane glazing from the conveyor to the lower bending shape and those of the bent glazing from the upper suction shape to the annular frame, are performed at the same time, so that a bending cycle contains no idle running period. On the other hand, both transport operations can be performed with increased acceleration and braking, therefore at a high speed, without harming in any way the transported hot glazings, given that the glazings each are applied by their entire surface on the corresponding suction surface of the plate-suction means or of the upper suction shape. In this way, the bending cycle can, on the whole, be shortened more and the profitability of the installation can consequently be further increased.

According to a first embodiment of the invention, the plate-suction means and the upper suction shape are mounted on separate carriages, set in motion and controlled independently of one another. According to another particularly simple and advantageous embodiment, the plate-suction means and the upper suction shape are attached by coupling and provided with a common drive. For this purpose, they can be mounted on a common carriage, so that they are coupled with force and can be displaced only together in a synchronous manner.

The lower shape, that cannot be displaced longitudinally, can advantageously be displaced vertically, whereas the upper suction shape is mounted on its mobile carriage to be movable longitudinally but not vertically.

Furthermore, the annular support frame which is movable longitudinally, is advantageously also mounted mobile vertically in the transfer station so that, during transfer of the bent glazing from the upper shape to the annular frame, the latter can be lifted entirely against the bottom of the upper shape as soon as the latter has reached its end position in the transfer station.

The lower shape can be concave—and is then preferably of the concave annular mold type, or convex—and in this case preferably of the type of mold having a convex solid surface. An upper convex shape with a solid surface corresponds to a lower shape of the concave annular frame type. In the case of a convex configuration of the lower shape, the upper shape can be designed as a bending mold with a solid surface exhibiting corresponding suction openings, or also in the form of a suction bell, i.e., essentially in the form of a suction mold with a frame-shaped bending surface.

In a development of the invention, between the plate-suction means and the transfer station there can be provided two (or more) successive stations for bending by pressing, each having an upper suction shape and a lower shape cooperating with it and that can slide vertically, each with a bending surface configuration that is modified in relation to the preceding bending molds, the various bending stations thus exhibiting progressive molding surfaces for step by step bending of the glazings. In this way, for more pronounced bendings, it is possible to perform the bending operation in several stages, while preserving the high profitability of the installation. Such bending by pressing, performed step by step, can be advantageous in the case of shapes of complex glazings. It is also advantageous for producing glazings exhibiting bendings that are more pronounced on the periphery, which can be produced, in the case of one-stage bending processes, only with bending molds equipped with hinged wings that can be folded back. Such hinged molds exhibit drawbacks which are avoided in the case of the step by step process according to the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a view in longitudinal section of a bending installation comprising two successive stations for bending by pressing in two successive operations.

DETAILED DESCRIPTION OF THE PREFERRED EMBODIMENTS

Figure 1:
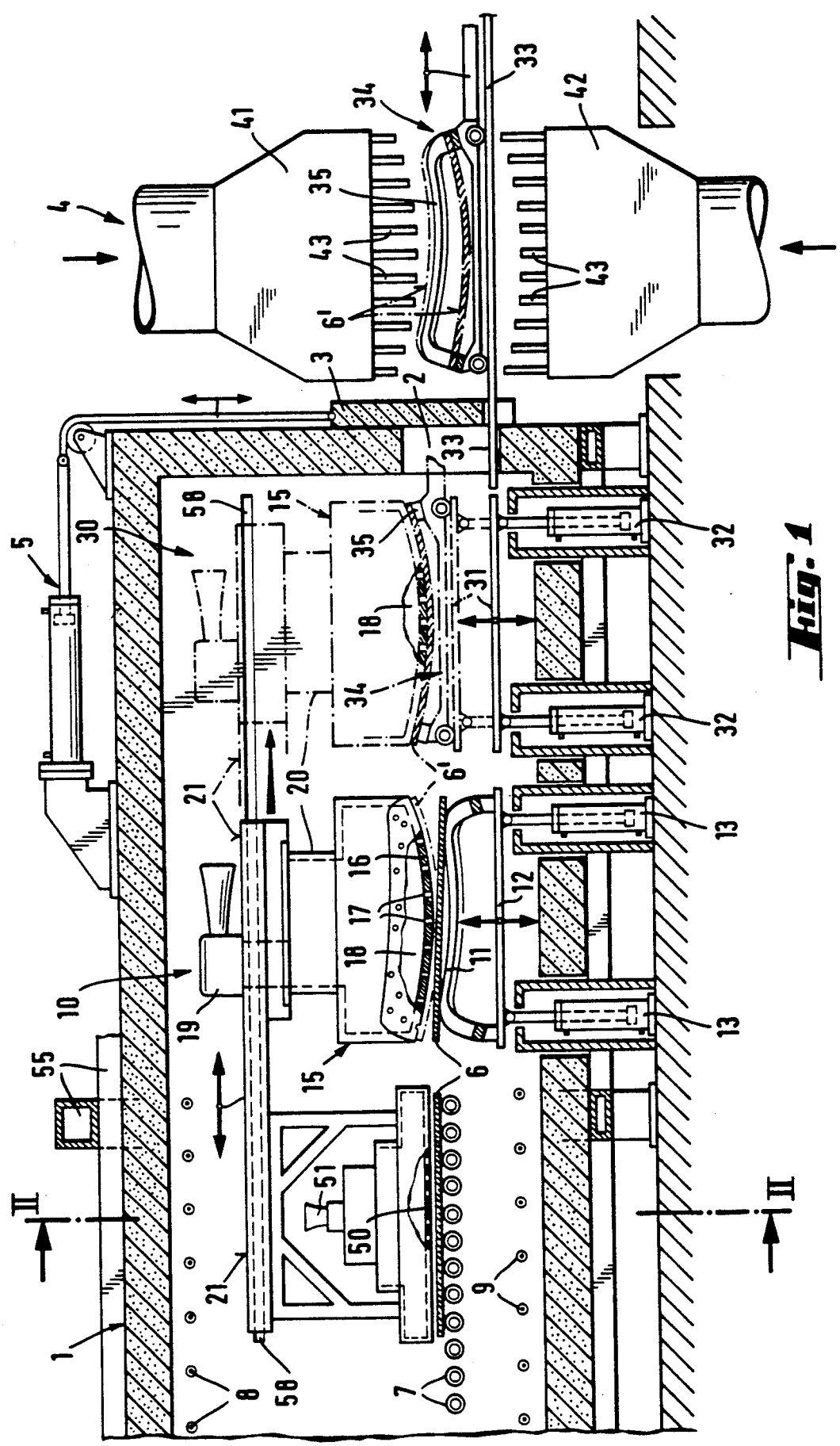
FIG. 1 is a view in longitudinal section of a bending installation according to the invention comprising an upper suction bending shape with a convex bending surface.
Figure 2:
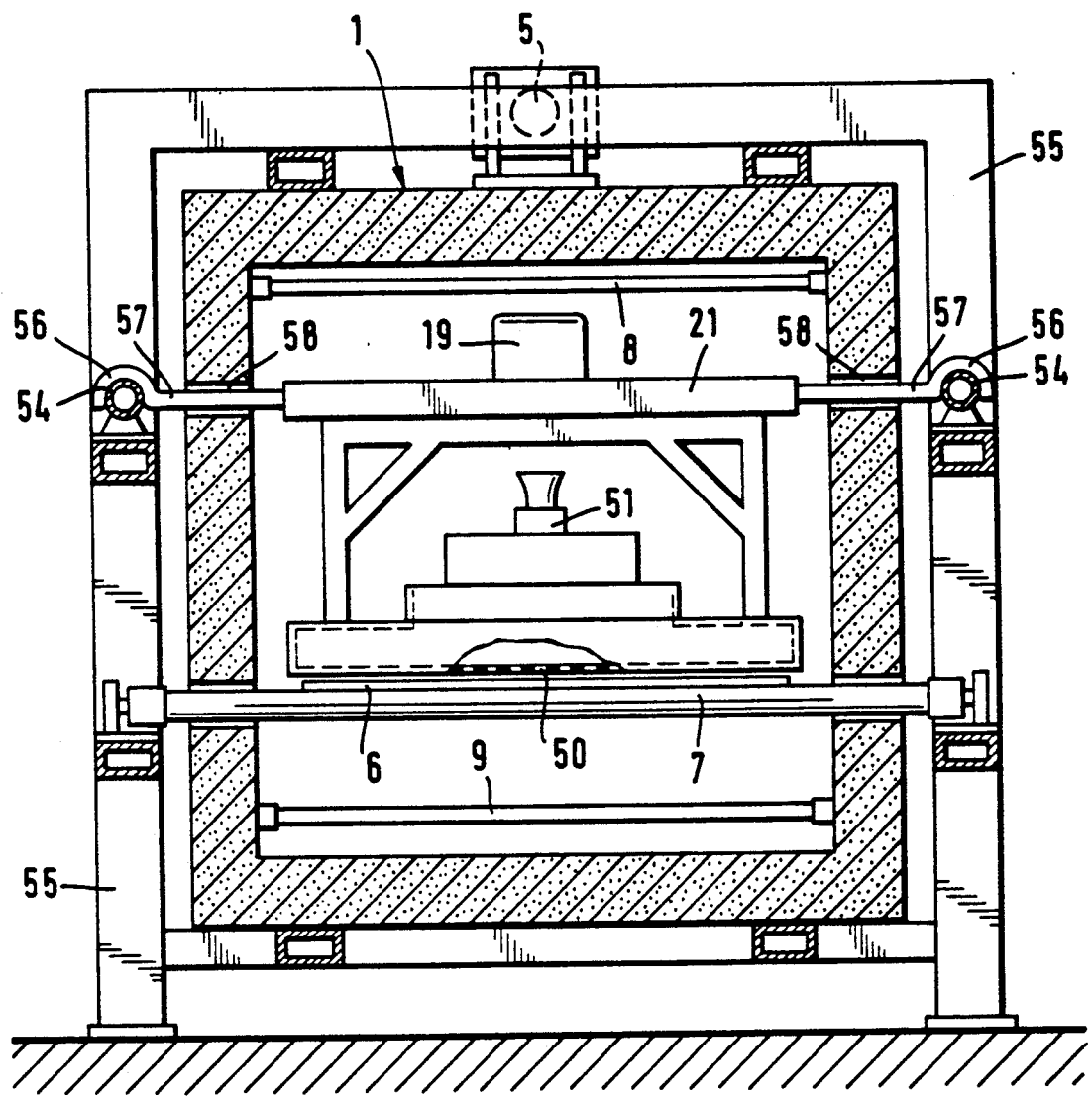
FIG. 2 is a view in cross section along line II—II of FIG. 1.

The installation illustrated in FIGS. 1 and 2 comprises an essentially closed furnace 1 having an end opening 2 which is closed by a door 3 and is open only when the finished bent glazing is transferred from furnace 1 to cooling station 4. This cooling station 4 is, for example, a heat tempering station. A lifting cylinder 5 is provided to actuate door 3. Inside furnace 1, glazings 6 that are on a conveyor made of driven conveyor rollers 7 are heated to their bending temperature by electric radiant heating devices 8, 9.

The conveyor is followed immediately by the station for bending by pressing 10. In bending station 10, lower shape 11 is mounted stationary on a support 12 which is movable in the vertical direction. The raising/lowering movements of support 12 with lower shape 11 are performed using pneumatic cylinders 13. Lower shape 11 is of the concave annular mold type.

Convex upper shape 15 consists of a mold with a solid surface whose convex wall 16 is provided with perforations 17 in communication with a chamber 18 under partial vacuum. The putting of chamber 18 under partial vacuum is performed by a suction fan 19 having a venturi tube. Upper suction shape 15 is fastened by a suitable holding device 20 to a carriage 21 that can be displaced horizontally.

In the direction of displacement of carriage 21, behind the station for bending by pressing, is located a transfer station 30 in which rails 31 are mounted to slide vertically. Rails 31 are raised and lowered by means of pneumatic cylinders 32. In low position, they are at the same height as rails 33 on the outside of furnace 1. On rails 31 and 33 is mounted a carriage 34 that carries annular support frame 35 whose configuration corresponds to the peripheral shape of the bent glazing.

On the outside of furnace 1 is cooling station 4 which, in the case shown, has the form of a heat tempering station and has an upper blowing chamber 41 and a lower blowing chamber 42. Blowing chambers 41, 42 are each equipped with blowing nozzles 43 to cool the bent glazings quickly for tempering purposes.

On the outside of upper bending shape 15, plane plate-suction means 50 is mounted rigidly on carriage 21. Plate-suction means 50, like suction shape 15, has a chamber that can be placed under partial vacuum with a fan 51, to lift glazing 6 from conveyor rollers 7 and transfer it to the station for bending by pressing 10.

Carriage 21, as FIG. 2 clearly shows, can be displaced on rails 54 mounted on the outside of furnace 1 itself, on framework 55 surrounding furnace 1. Arms 57 of carriage 21 carry supports 56 that slide on rails 54 and go through slots 58 in the side walls of furnace 1 and extend outward.

The method of operation of the installation, briefly described, is as follows: When a glazing 6 heated to the bending temperature reaches the end of roller conveyor 7, carriage 21 is in its starting position in which plane plate-suction means 50 is located above glazing 6 and suction shape 15 above lower bending shape 11. While plate-suction means 50 is to lift glazing 6 from conveyor rollers 7 by activation of fan 51, cylinders 13 and fan 19 are simultaneously actuated. Because of the action of cylinders 13, lower annular shape 11—on which is then located the previous glazing deposited during the preceding displacement cycle of carriage 21—is lifted and is pressed against upper bending shape 15. As a result of the partial vacuum that is established in chamber 18, bent glazing 61 is applied completely on the bending surface of wall 16 and is held in this position. Lower bending shape 11 is then again lowered by cylinders 13.

When, in this way, plane glazing 6 is held by plate-suction means 50 and bent glazing 61 by suction bending shape 15, the drive of carriage 21 is activated and carriage 21 is displaced toward its other end position. In this other end position, where only suction bending shape 15 has been represented (in broken lines), plate-suction means 50 is above lower bending shape 11 and suction shape 15 is in transfer station 30 in which, at this moment, carriage 34 with frame 35 is found on rails 31. Then, in the hollow interior of plate-suction means 50, a brief excess pressure is produced, which has the effect of detaching glazing 6 from plate-suction means 50 and depositing it on lower bending shape 11. Simultaneously, by activation of cylinders 32, frame 35 is lifted and by a brief excess pressure in chamber 18, bent glazing 61 is deposited on frame 35. While frame 35 carrying the bent glazing is again lowered, then transferred to cooling station 4, carriage 21 returns to its starting position and the next bending cycle can begin.

Figure 3:
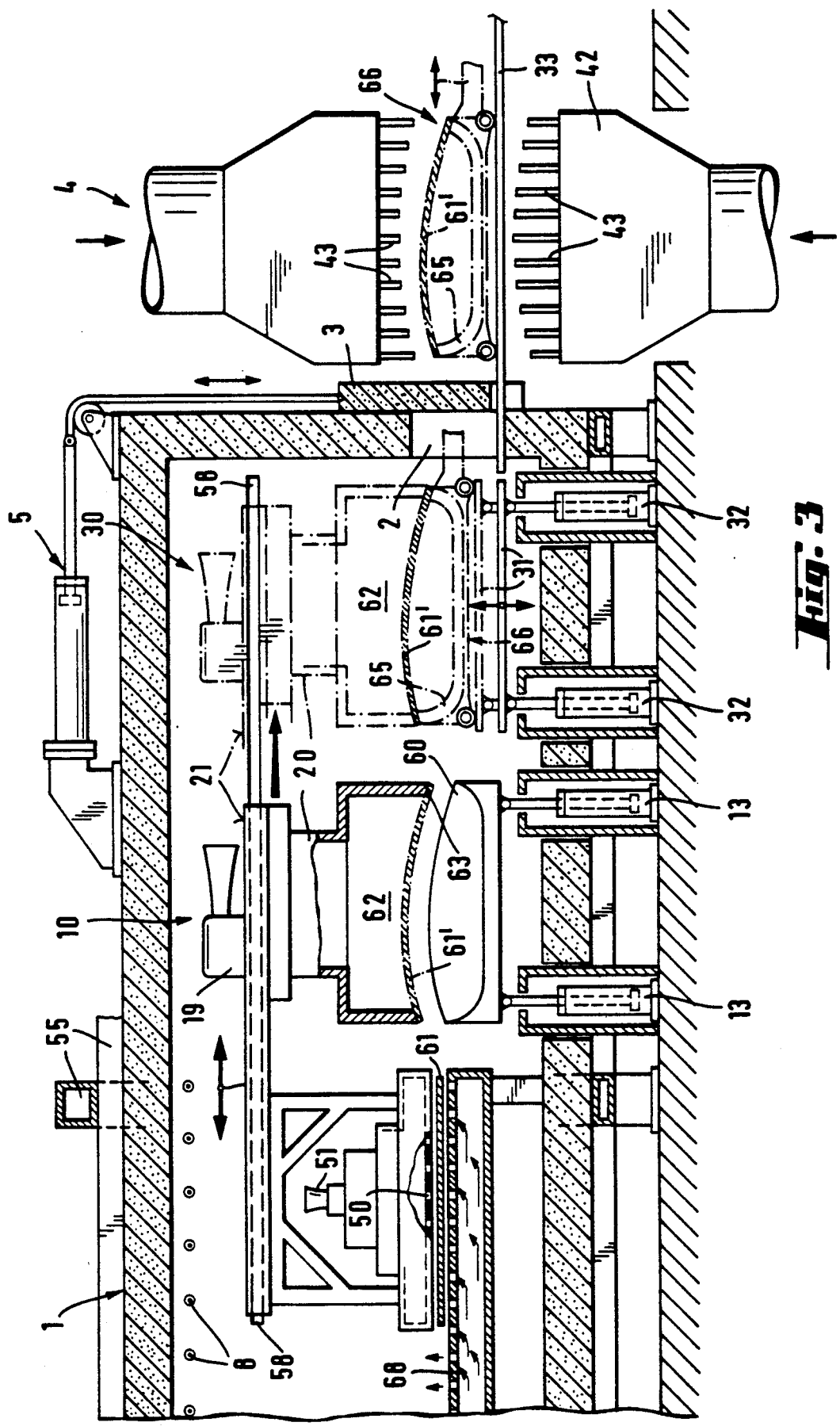
FIG. 3 is a view in longitudinal section of a bending installation comprising a lower bending shape with convex bending surface and an upper suction shape of the suction bell type.

The installation shown in FIG. 3 is essentially similar to the installation already described except that lower shape 60 this time consists of a bending mold with a convex solid surface, i.e., bent upward, and that upper suction shape 62 has the shape of a suction bell whose lower marginal surface 63 corresponds to the nominal shape of bent glazing 61' and represents the annular counterpart of solid surface mold 60. Annular frame 65, mounted on carriage 66, is also bent upward in a convex manner. Furthermore, in the example shown here, the conveyor is no longer made of conveyor rollers, but of a hot gas cushion 68 and glazings 61 are transported through the furnace while floating on gas cushion 68. The progress of a bending cycle is, for the remainder, identical with the one described with reference to FIGS. 1 and 2.

FIG. 4 illustrates an installation having two successive bending stations 70 and 80 in which glazings 86 are bent step by step. Lower bending shape 71 of bending station 70 is of the concave annular mold type. It is the same for lower shape 81 of bending station 80, while upper suction shapes 72 and 82, respectively of bending stations 70 and 80, are both of the convex mold type with solid surface. In bending station 70, a partial bending 86' is communicated to still-plane glazings 86 using bending shapes 71, 72, while the final fashioning 86" in bending station 80 is performed with bending shapes 81, 82. The two upper shapes 72 and 82 are mounted by corresponding fasteners 73, 83 on a common carriage 85 to which plate-suction means 50 is also fastened. Suction shape 72 is placed under partial vacuum with fan 74 and suction shape 82 is placed under partial vacuum with fan 84. To transfer the finished bent glazings to cooling station 4, concave annular frame 88 is used which is mounted on carriage 89 and which can be displaced to transfer finished bent glazings 86" to transfer station 30.

Carriage 85 is again displaced alternately in two end positions. In the left end position, plate-suction means 50 receives plane glazing 86 heated to its bending temperature from conveyor rollers 7, lower bending shapes 71 and 81 are lifted simultaneously by activation of the associated cylinders 77 and 87 and press glazings 86' and 86" which are laid on their surfaces, against the associated upper suction shapes 72, 82 against which they are held by suction effect. The two lower bending shapes 71 and 81 are lowered and carriage 85 is displaced now toward the right end position. In this way, plane glazing 86 are transferred simultaneously to bending station 70, prebent glazing 86' to bending station 80, and finished bent glazing 86" to transfer station 30 in which annular frame 88 is found at this moment. Plate-suction means 50 and the two suction bending shapes 72 and 82 are briefly placed under pressure, thanks to which plane glazing 86 is deposited on lower shape 71, prebent glazing 86' is simultaneously deposited on lower shape 81 and finished bent glazing 86" is simultaneously deposited on annular frame 88. Then carriage 85 returns to its starting position and the next cycle begins.

Obviously, numerous modifications and variations of the present invention are possible in light of the above teachings. It is therefore to be understood that within the scope of the appended claims, the invention may be practiced otherwise than as specifically described herein.

What is claimed as new and new and desired to be secured by Letters Patent of the United States is:

1. Installation for the bend of glazings, comprising:
    a continuous furnace for heating glazings to a bending temperature;
    a conveyor for conveying glazings through the furnace;
    means, including a lower bending shape, for defining at least one bending station in the furnace;
    means for defining a transfer station in the furnace;
    plate suction means in the furnace and mounted for displacement to transport glazings from the conveyor to the lower bending shape of the at least one bending station;
    an upper suction shape, in the furnace, for bending a glazing in the at least one bending station and mounted for displacement to transport glazings from the at least one bending station to the transfer station in synchronism with movement of the plate suction means, so that the displacement to transport glazings of said plate suction means is performed simultaneously with the displacement to transport glazings of said upper suction shape; and
    an annular frame movable between said transfer station, where a glazing is transferred thereto from the upper suction shape, and a cooling station outside of said furnace.

2. The installation of claim 1 including common drive means for both said plate suction means and said upper suction shape.

3. The installation of claim 2 including a common carriage on which said plate suction means and said upper suction shape are mounted.

4. The installation of claim 1 including means in said at least one bending station for vertically moving said lower bending shape.

5. The installation of claim 1 wherein said upper suction shape comprises a convex mold with a perforated surface and the lower bending shape comprises an annular mold.

6. The installation of claim 1 wherein said upper suction shape comprises a concave annular mold and said lower bending shape comprises a convex solid surface.

7. The installation of claim 1 including means in said transfer station for vertically moving said annular frame.

8. The installation of claim 1 wherein said at least one bending station comprises two serially arranged bending stations, including an upper suction shape and a lower bending shape for each of said bending stations, the suction shape of one of the bending stations closest to the transfer station having a more pronounced curvature than the suction shape of the other of the bending stations.

9. The installation of claim 1 wherein said plate suction means and said upper suction shape are independently driven.

* * * * *